Figure 1:
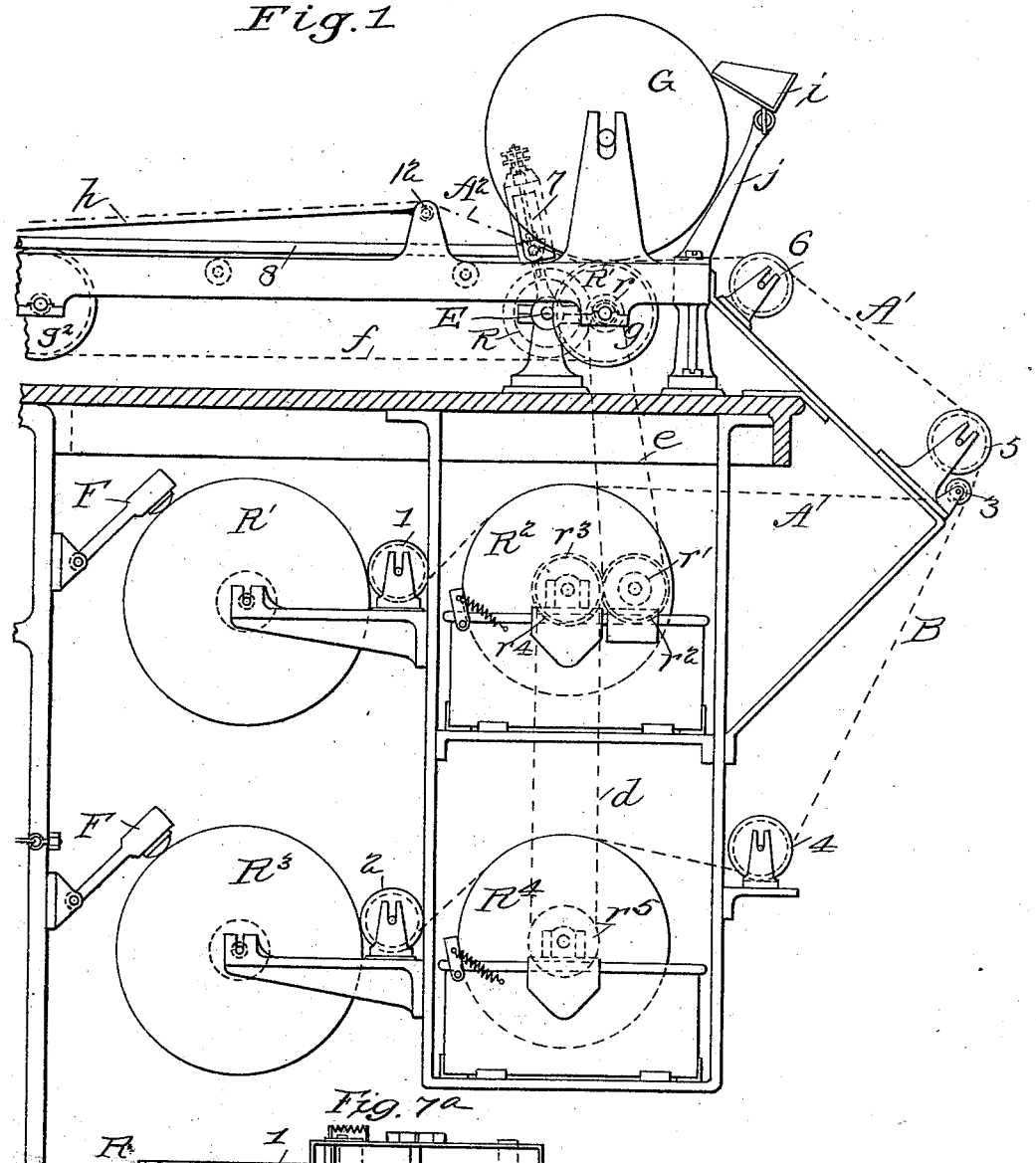

G. PATUREAU.
MACHINE FOR SHAPING BOXES.

No. 513,528.  Patented Jan. 30, 1894.

14 Sheets—Sheet 1.

WITNESSES:
E. B. Bolton
E. K. Sturtevant

INVENTOR
Gabriel Patureau
BY Richards
ATTORNEYS (No Model.) 14 Sheets—Sheet 2.

G. PATUREAU.
MACHINE FOR SHAPING BOXES.

No. 513,528. Patented Jan. 30, 1894.

WITNESSES:
E. R. Bolton
E. K. Sturtevant

INVENTOR
Gabriel Patureau
BY
Richards
ATTORNEYS (No Model.) 14 Sheets—Sheet 3.
G. PATUREAU.
MACHINE FOR SHAPING BOXES.
No. 513,528. Patented Jan. 30, 1894.
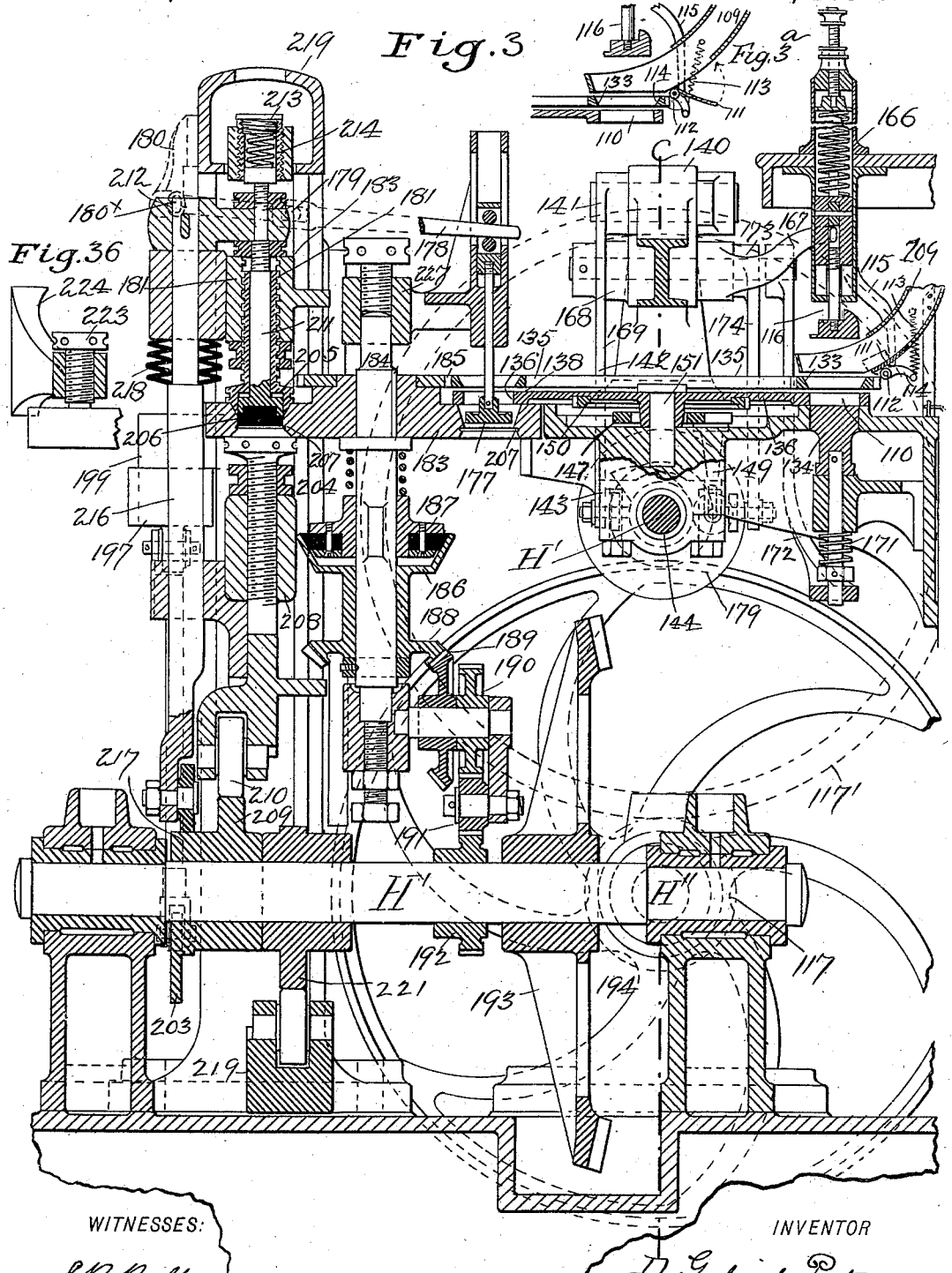

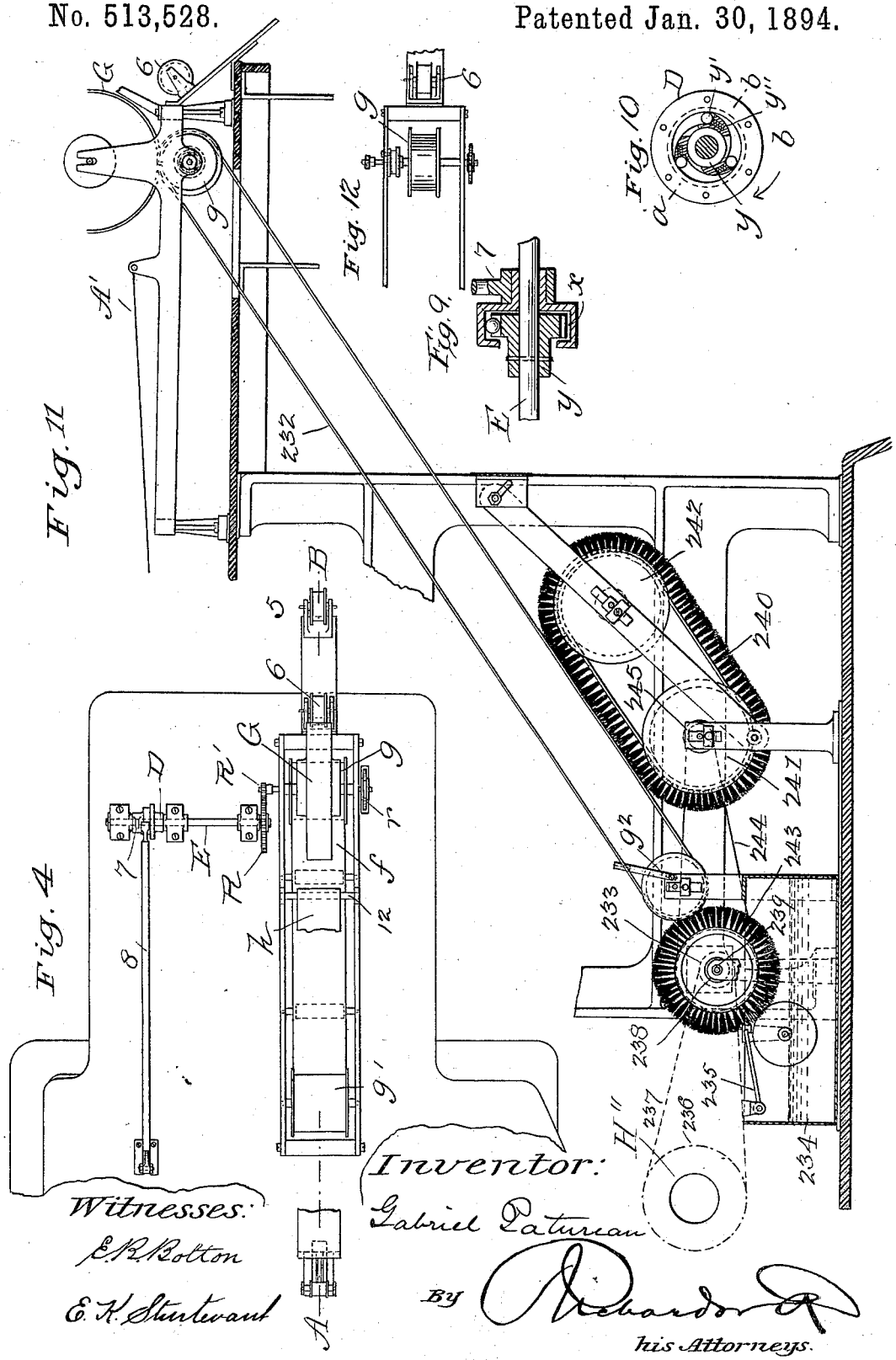

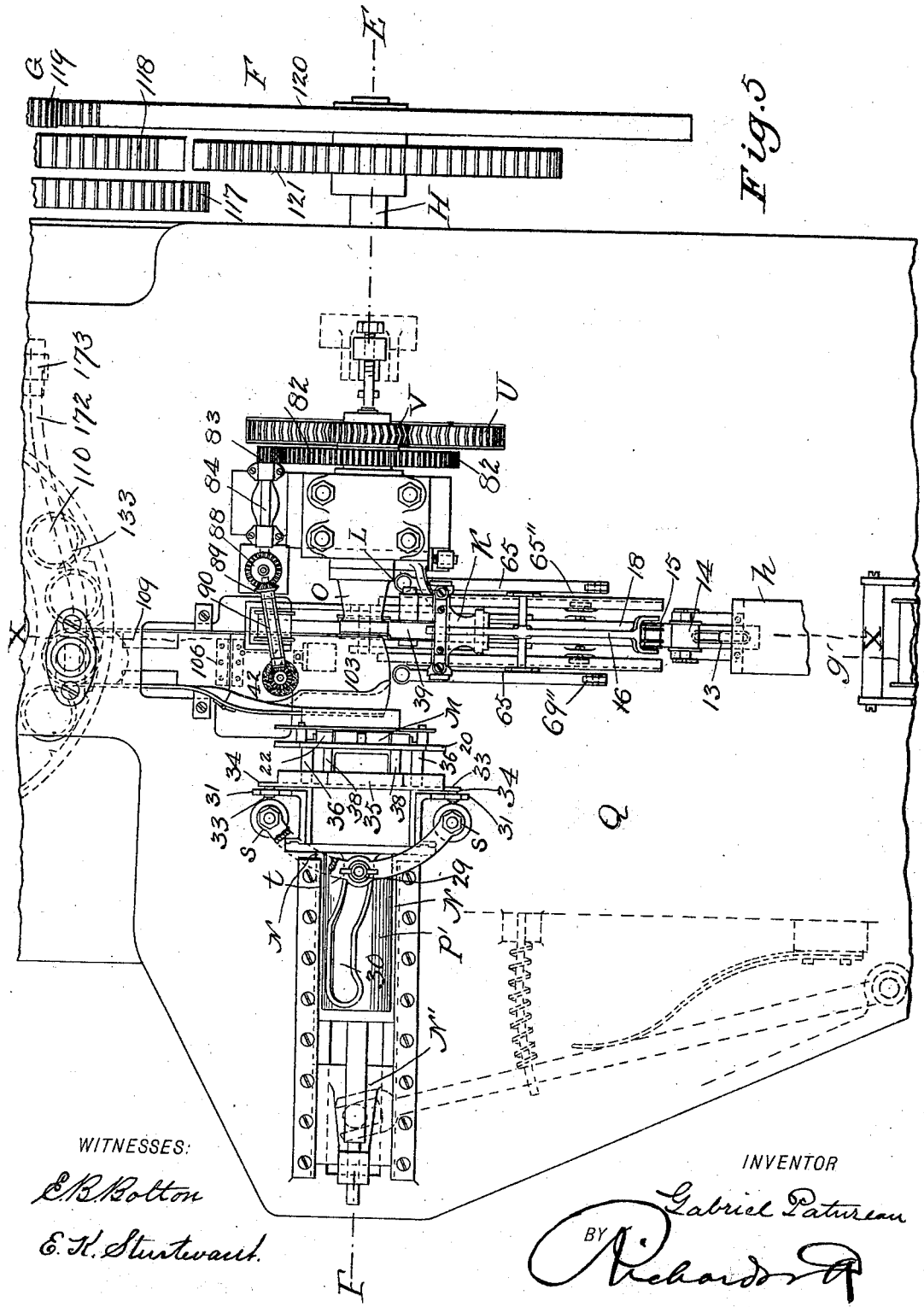

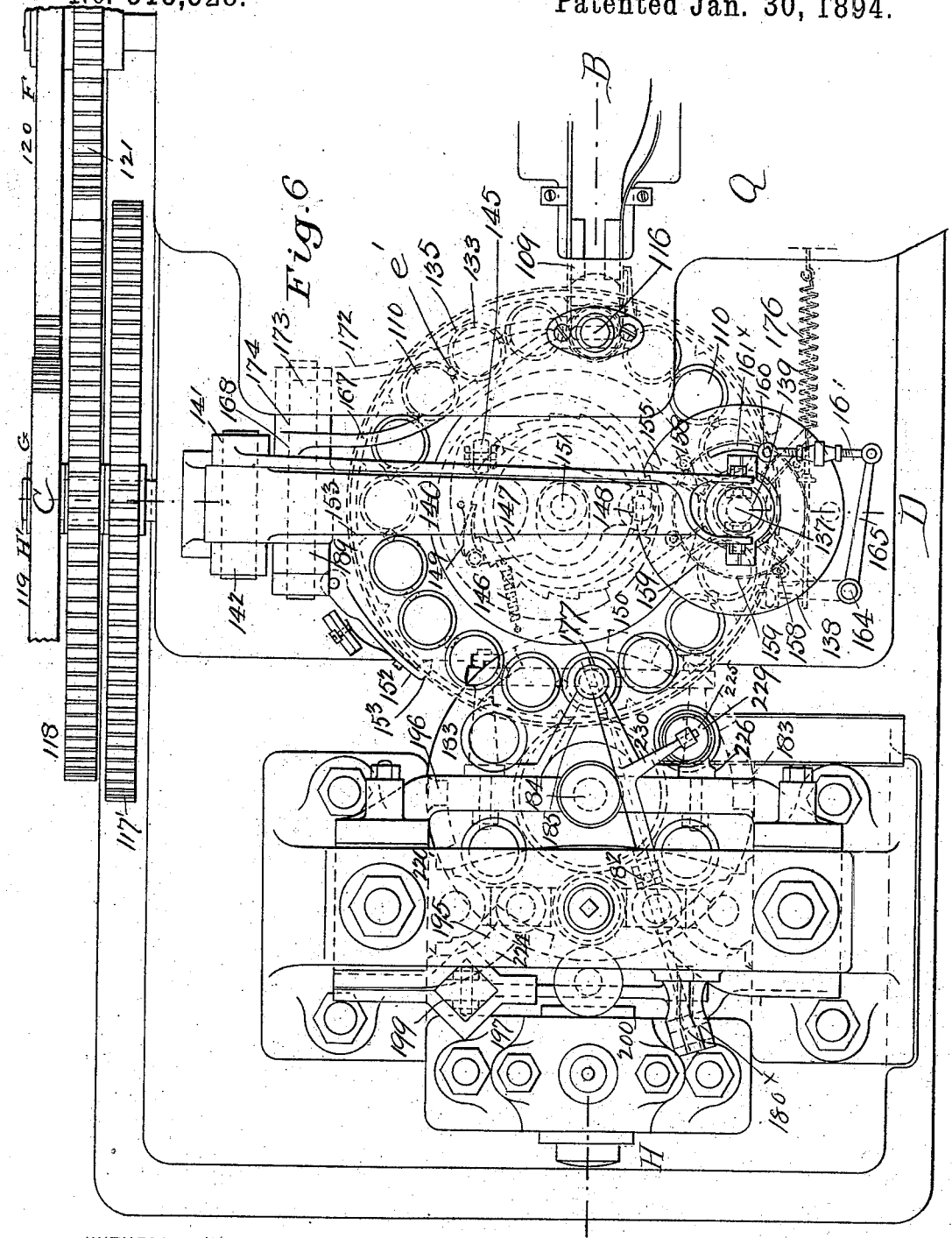

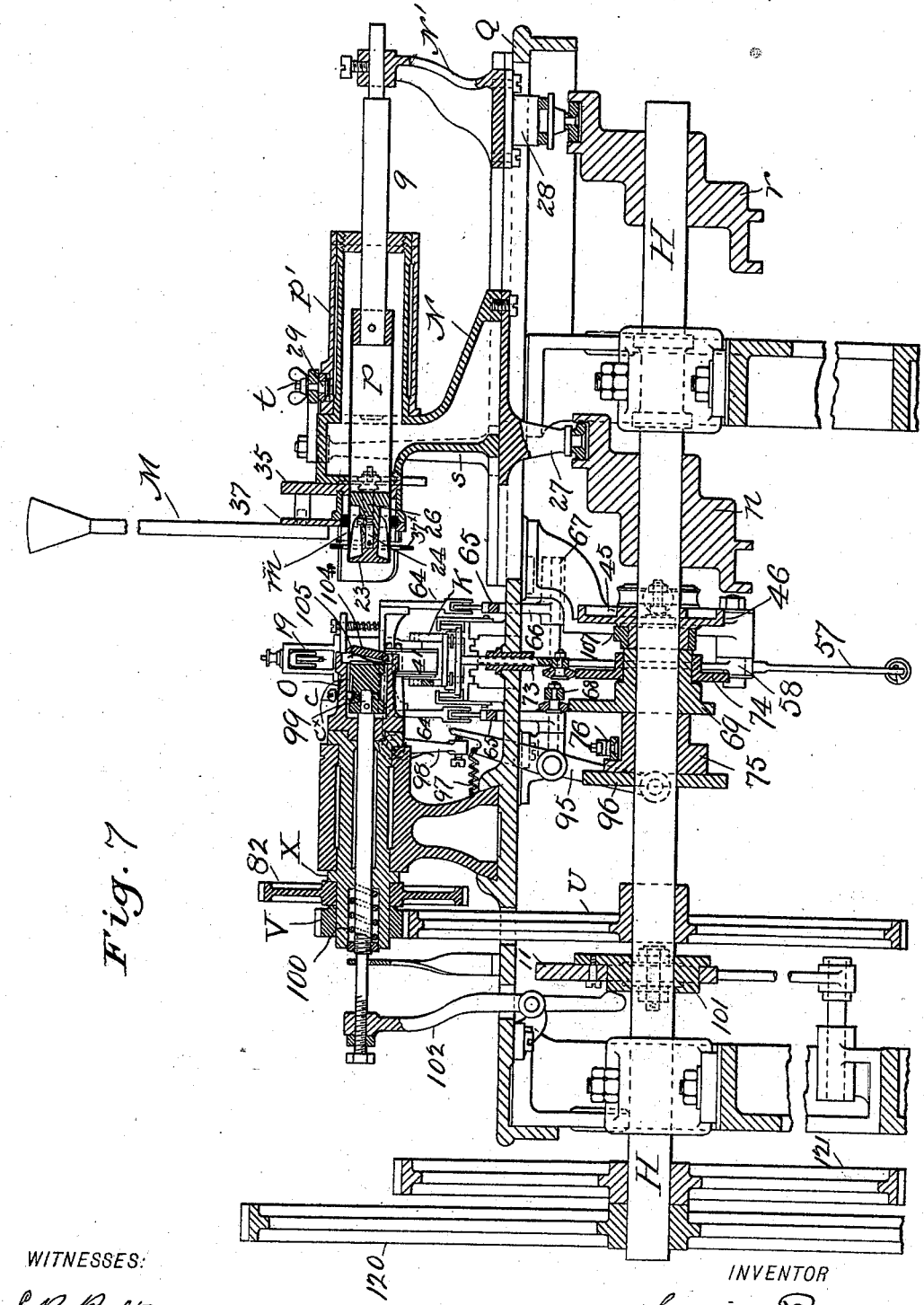

(No Model.)　　　　　　G. PATUREAU.　　　　14 Sheets—Sheet 8.
MACHINE FOR SHAPING BOXES.
No. 513,528.　　　　　　　　Patented Jan. 30, 1894.

(No Model.) 14 Sheets—Sheet 9.
G. PATUREAU.
MACHINE FOR SHAPING BOXES.
No. 513,528. Patented Jan. 30, 1894.
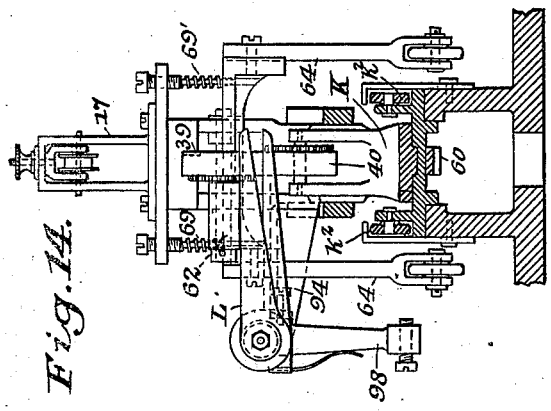
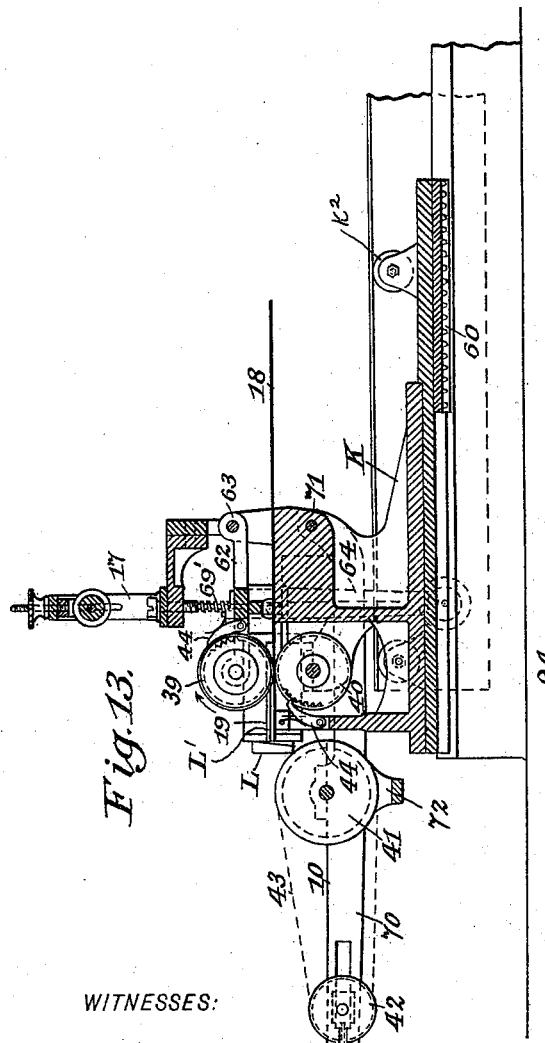
Fig. 32.
Fig. 35.
Fig. 34.
Fig. 33.
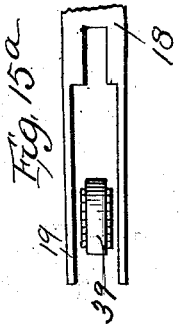
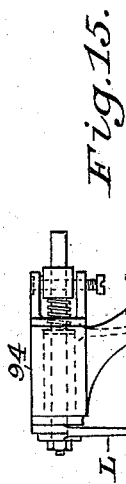
WITNESSES:
E. B. Bolton
E. K. Sturtevant
INVENTOR
Gabriel Patureau
BY
ATTORNEYS (No Model.)
14 Sheets—Sheet 10.
G. PATUREAU.
MACHINE FOR SHAPING BOXES.
No. 513,528. Patented Jan. 30, 1894.
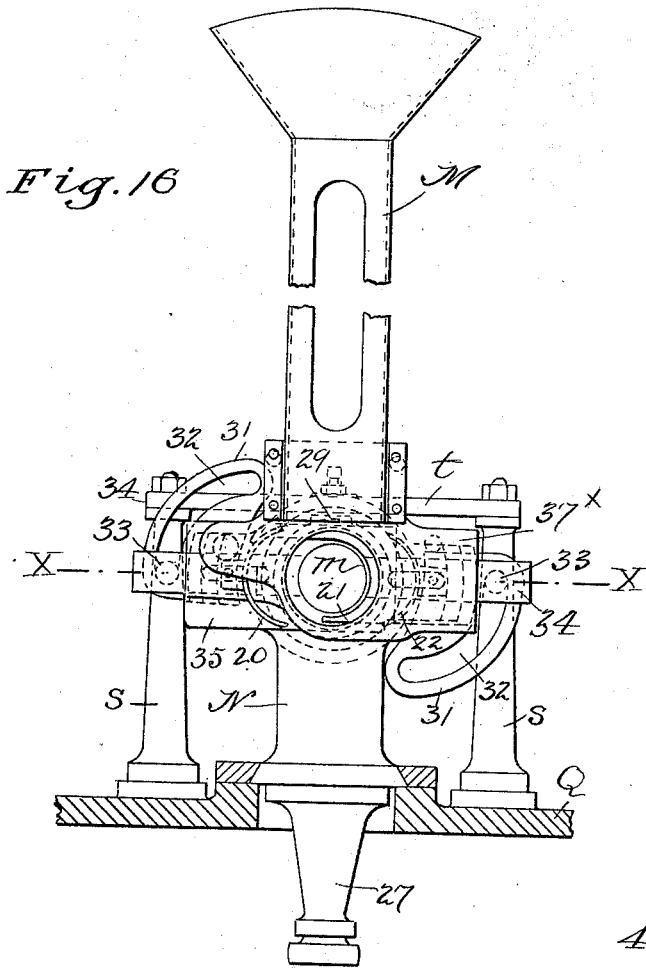
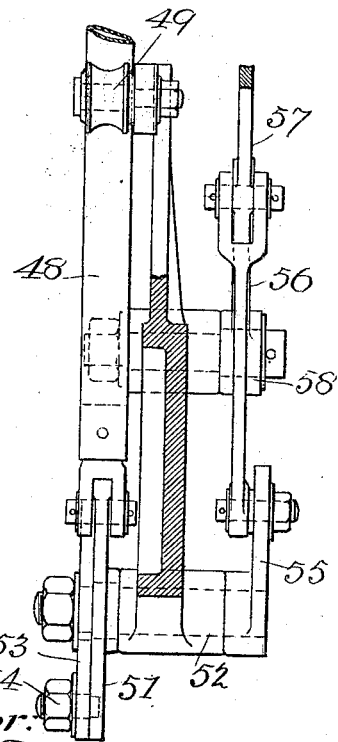
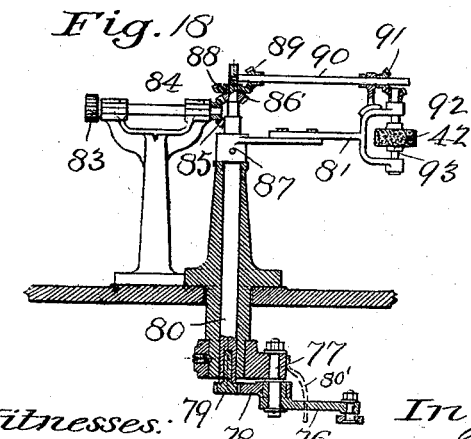
Witnesses.
E. B. Bolton
E. K. Sturtevant
Inventor.
Gabriel Patureau
By Richards
his Attorneys.
THE NATIONAL LITHOGRAPHING COMPANY,
WASHINGTON, D. C.

(No Model.)

G. PATUREAU.
MACHINE FOR SHAPING BOXES.

No. 513,528.

14 Sheets—Sheet 11.

Patented Jan. 30, 1894.

WITNESSES:
E. B. Bolton
E. K. Sturtevant.

INVENTOR
Gabriel Patureau
BY
Richards
ATTORNEYS (No Model.) 14 Sheets—Sheet 12.

G. PATUREAU.
MACHINE FOR SHAPING BOXES.

No. 513,528. Patented Jan. 30, 1894.

WITNESSES:
E. B. Bolton
E. K. Sturtevant

INVENTOR
Gabriel Patureau
BY
Richards
ATTORNEYS

THE NATIONAL LITHOGRAPHING COMPANY,
WASHINGTON, D. C.

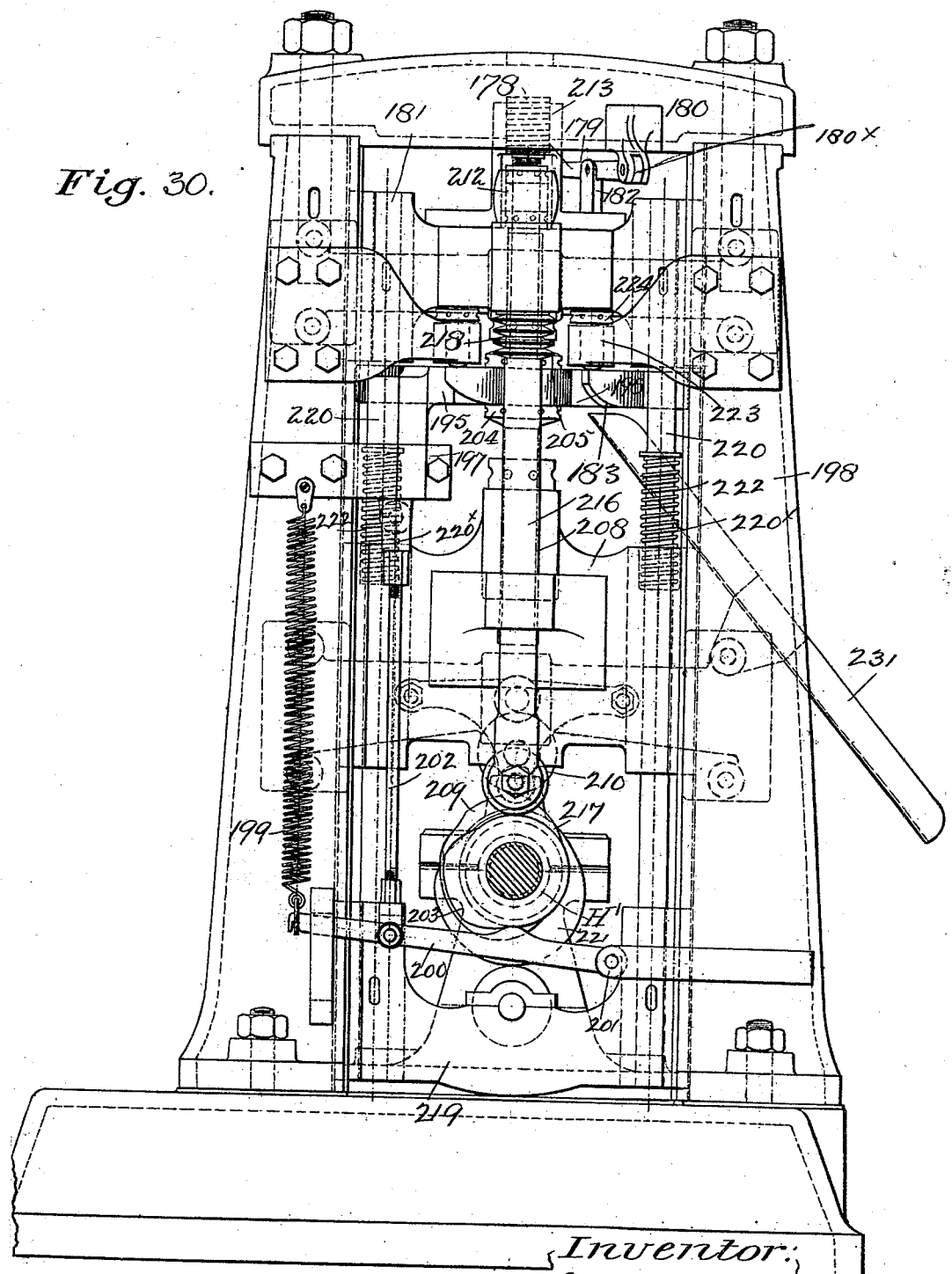

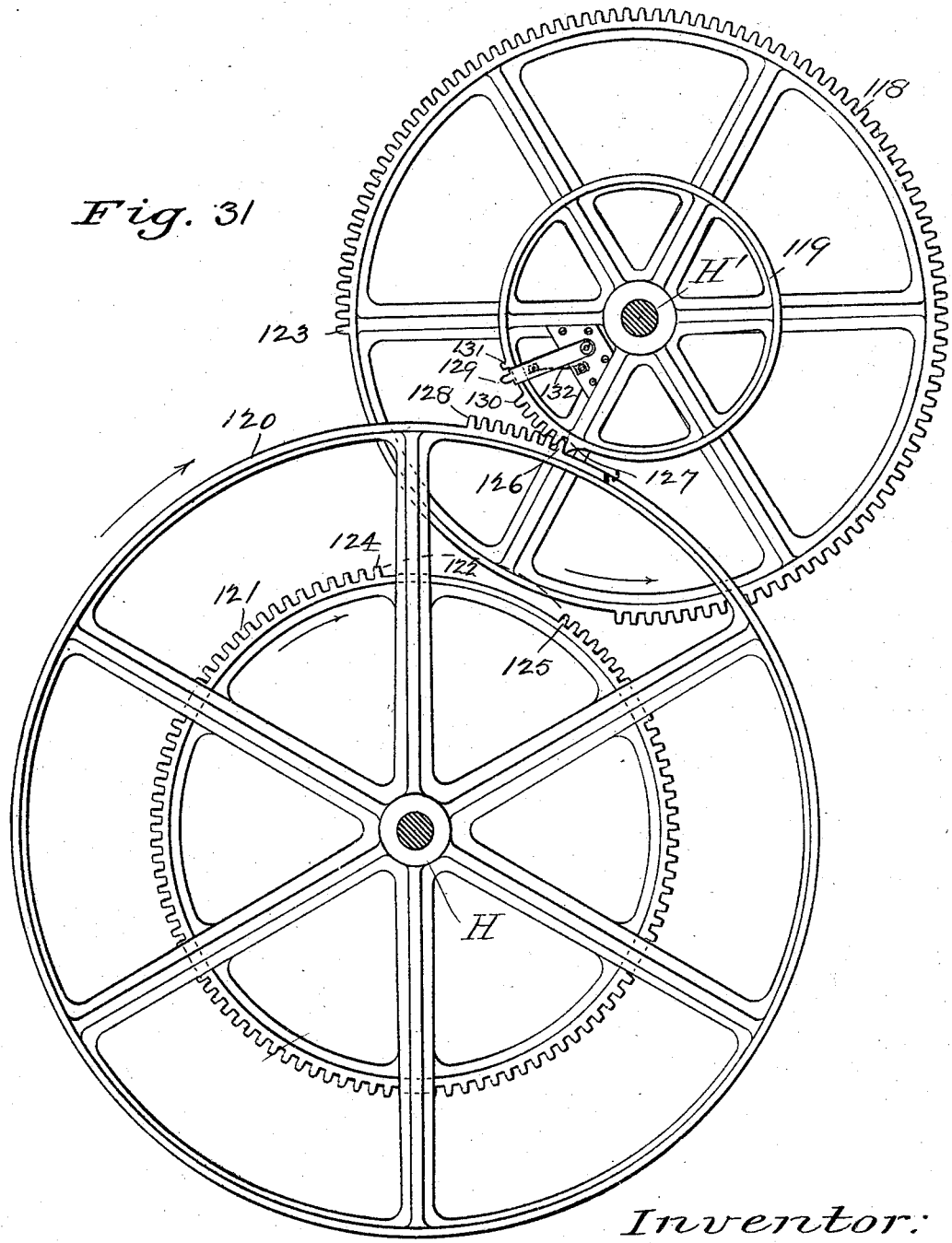

UNITED STATES PATENT OFFICE.

GABRIEL PATUREAU, OF PARIS, FRANCE.

MACHINE FOR SHAPING BOXES.

SPECIFICATION forming part of Letters Patent No. 513,528, dated January 30, 1894.

Application filed December 1, 1892. Serial No. 453,796. (No model.) Patented in Germany January 14, 1890, No. 56,632, January 6, 1891, No. 59,937, and August 24, 1892, No. 68,798; in England December 16, 1890, No. 20,520, and August 6, 1892, No. 14,252; in France July 30, 1892, No. 223,344; in Switzerland August 3, 1892, No. 5,825; in Belgium August 16, 1892, No. 100,803; in Italy August 22, 1892, No. 32,447, and in Spain September 21, 1892, No. 13,647.

*To all whom it may concern:*

Be it known that I, GABRIEL PATUREAU, a citizen of the Republic of France, residing at Paris, France, have invented an Improvement in Machines for Shaping Boxes, of which the following is a specification.

The invention has been patented in foreign countries as follows: Germany, No. 56,632, dated January 14, 1890, No. 59,937, dated January 6, 1891, and No. 68,798, dated August 24, 1892; Belgium, No. 100,803, dated August 16, 1892; Spain, No. 13,647, dated September 21, 1892; England, No. 20,520, dated December 16, 1890, and No. 14,252, dated August 6, 1892; France, No. 223,344, dated July 30, 1892; Italy, No. 32,447, dated August 22, 1892, and Switzerland, No. 5,825, dated August 3, 1892.

It is the object of my invention to provide a machine for forming and dressing boxes of pasteboard or like material in which cup shaped blanks are formed and fed to a revolving chuck which holds and turns them while the paper dressing strip is fed forward and the proper length severed and this severed portion being caught and wound about the revolving blank on the chuck to dress the said blank.

My invention includes the mechanism for carrying out this operation; the means for forming the paper dressing strip of two or more layers and providing the same with paste; the means acting in conjunction with the chuck for pressing and shaping the strip to the cup shaped blank, means for turning the upper projecting edge of the dressing strip down into the box to paste the same therein; means for finally pressing the box and upsetting the flange thereof and in the various mechanisms hereinafter described which enable me to reduce my invention to practical form.

Figure 7A:
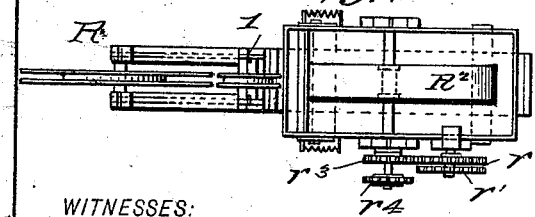
Figure 2:
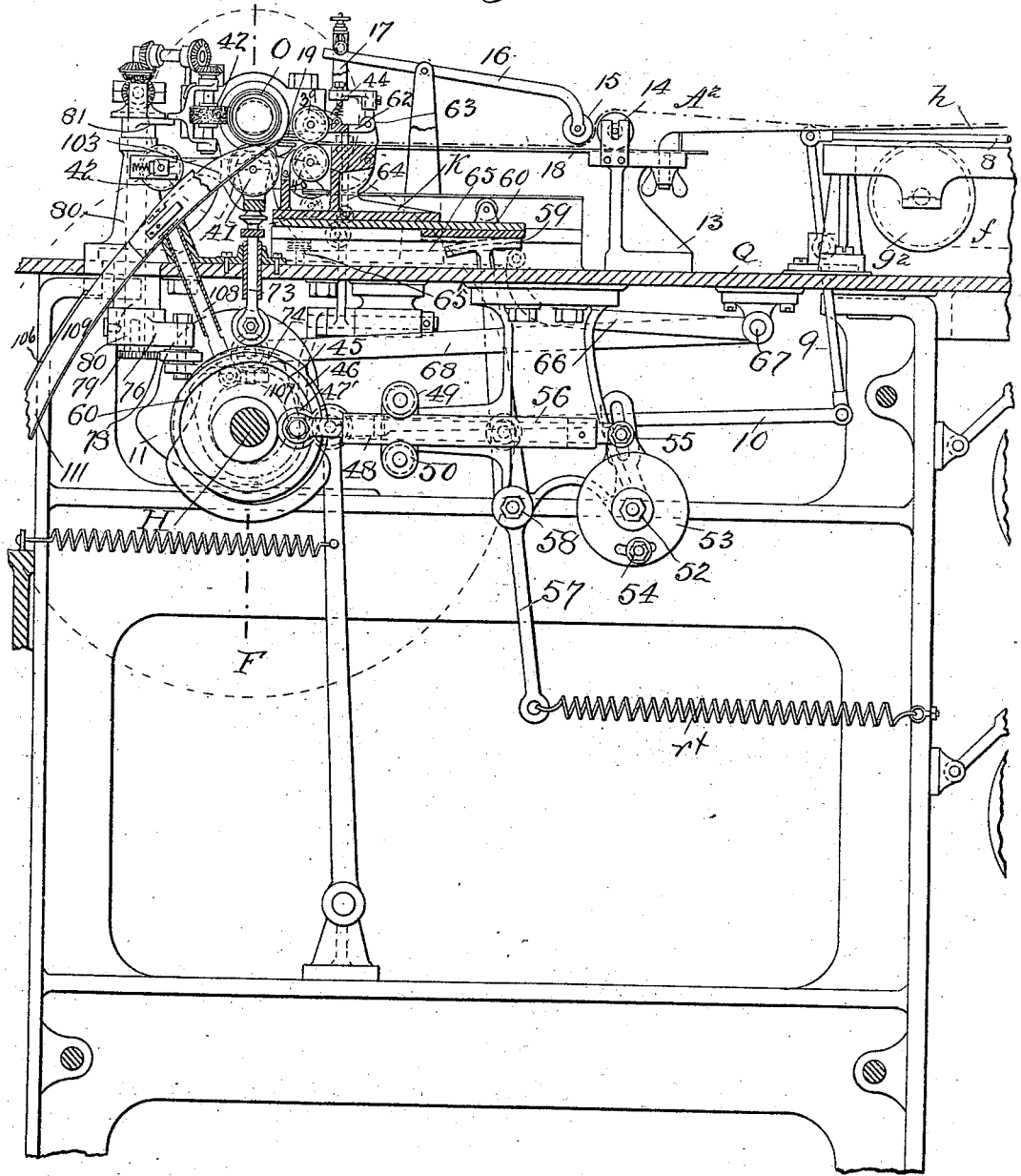
Figures 8, 8A:
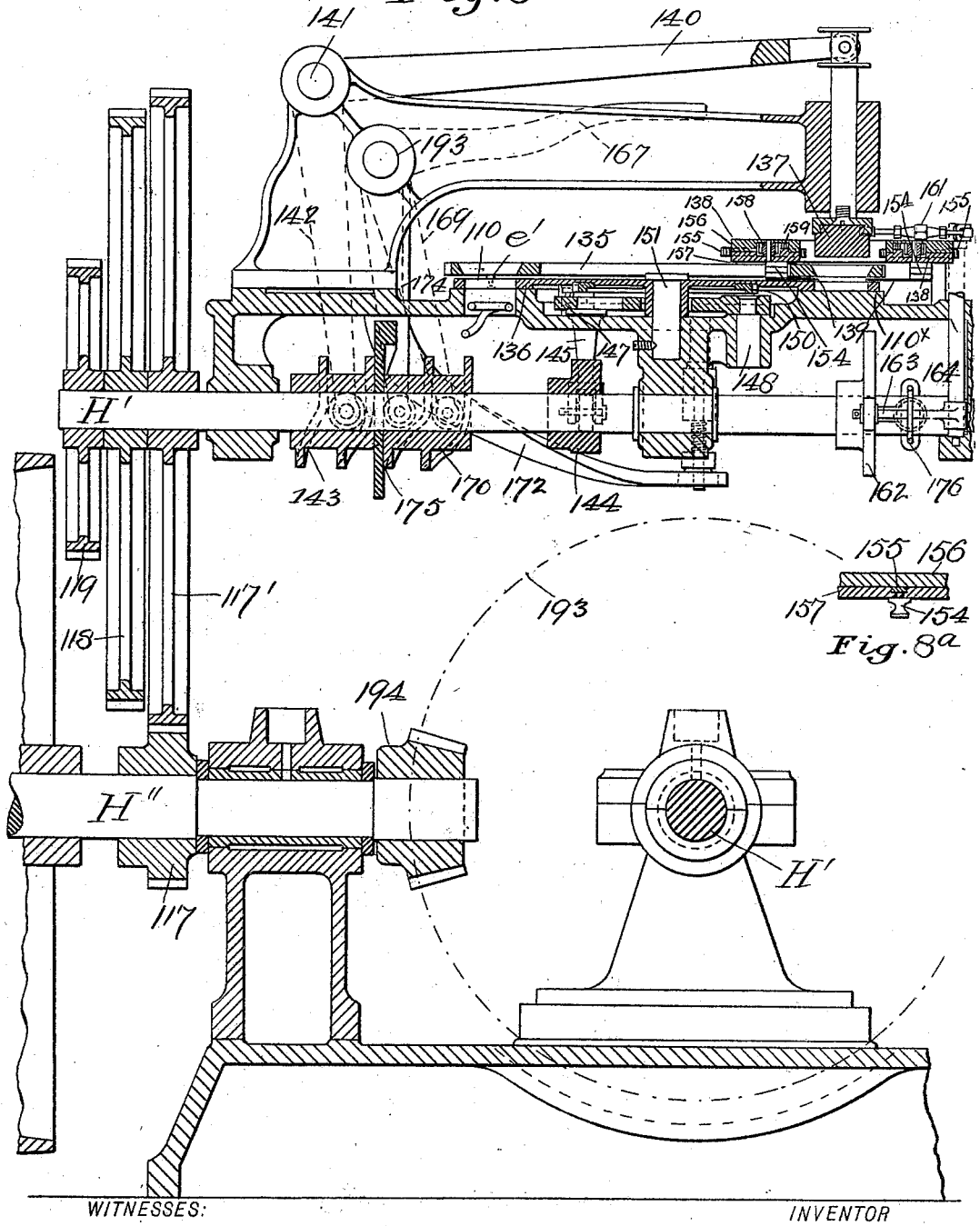
Figure 19:
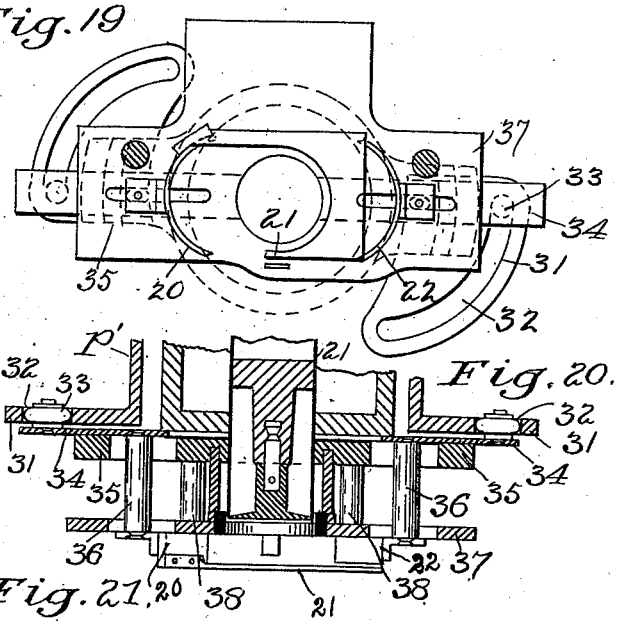
Figure 20:
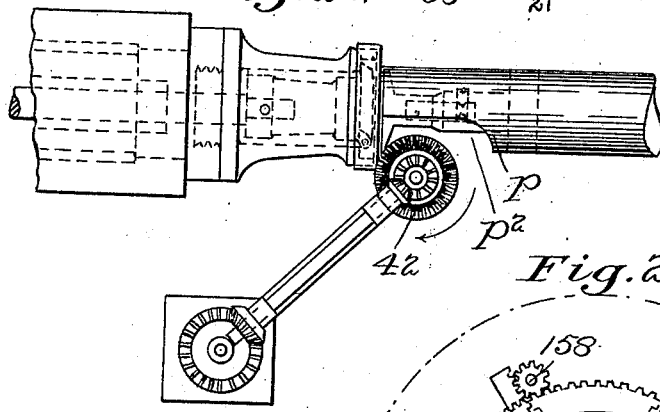
Figure 22:
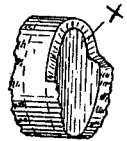
Figure 24:
Figure 23:
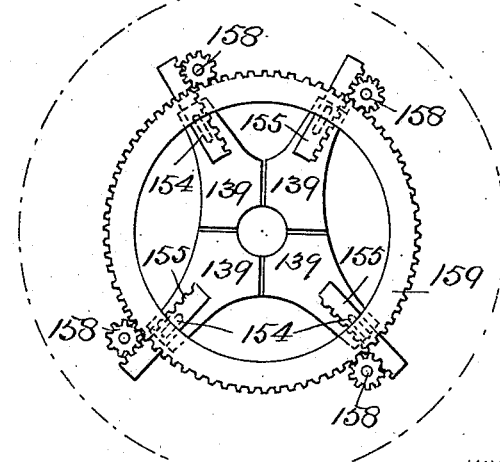
Figure 29:
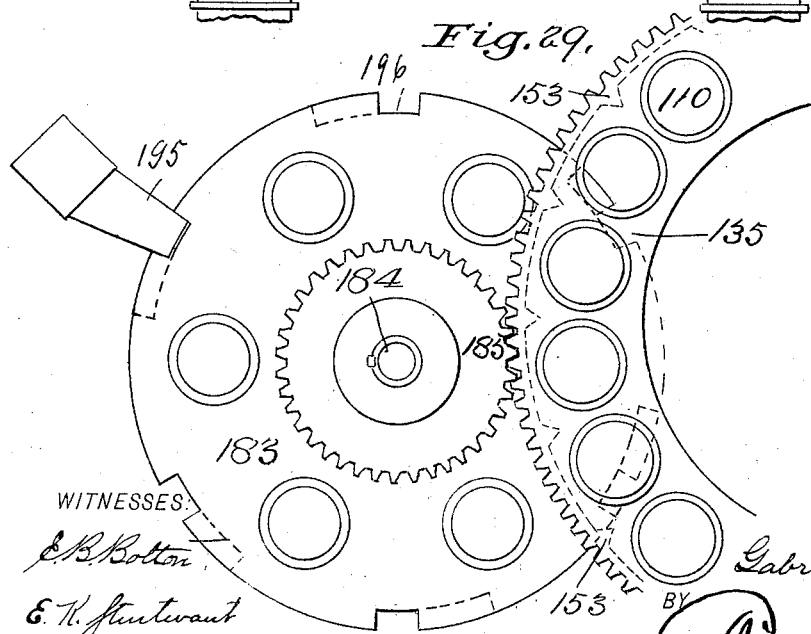

In the drawings:—Figures 1, 2 and 3, taken together represent generally the entire machine or groups of mechanisms in proper order; Fig. 1, being a side elevation of the front end of the machine from which the paper dressing strip starts; Fig. 2, being a central vertical section (on line $x-x$ of Fig. 5) of the central portion of the machine with parts in elevation, and Fig. 3, being a similar view (on line A—B, Fig. 6) of the rear or discharge end of the machine. Fig. 3$^a$ is a detail view showing the action of the hinged flap at the lower part of the capsule conduit. Figs. 4, 5 and 6 taken jointly represent a plan view of the entire machine; Fig. 4, being a plan of Fig. 1; Fig. 5, a plan of Fig. 2, and Fig. 6, a plan of Fig. 3. Fig. 6$^a$ is a view of a detail. Fig. 7, is a vertical sectional view on line E, F of Figs. 2 and 5. Fig. 7$^a$ is a detail plan view of part of the driving gearing of Fig. 1. Fig. 8, is a vertical sectional view on line C, D of Figs. 3 and 6. Fig. 8$^a$ is a detail sectional view of a part of Fig. 8. Figs. 9 and 10, are detail views of the clutch box for operating the feed rollers and pasting rollers of Fig. 1. Fig. 11, is a modified form of the means for taking the surplus glue from the strip. Fig. 12, is a detail plan view of the same. Fig. 13, is a vertical section of the reciprocating feed carriage for the dressing strip, with parts in elevation. Fig. 14, is an end view of the same, and Fig. 15, a plan view. Fig. 15$^a$ is a detail view of the table over which the paper strip is passed to the winding apparatus. Fig. 16, is a front view of the hopper for the cup shaped blanks and the feeding carriage therefor. Fig. 17, is a detail view of some of the operating connections. Fig. 18, is a detail view of the strip applying brush and driving means therefor. Fig. 19, is a detail front view of some of the parts shown in Fig. 16, particularly those for shaping the blank. Fig. 20, is a sectional plan view of the same on line $x-x$. Fig. 21, is a detail of the chuck, the piston for applying the blank thereto and the strip applying brush. Fig. 22, is a detail view of a capsule with a strip partially applied thereto. Fig. 23, is a plan view of details. Fig. 24, is a view of a capsule blank in the rough. Figs. 25, 26, 27 and 28 show the several steps in pressing the box to form the flange. Fig. 29, is a detail plan view of driving mechanism, and capsule carrying plates or tables. Fig. 30, is an end view of Fig. 3. Fig. 31 shows speed changing gearing. Figs. 32, 33, 34 and 35 are detail views of the box in different stages of completion. Fig. 36, is a detail of a part of Figs. 3 and 30.

Referring to Fig. 1, the strips of paper being stored upon the cylinders R' and R³ pass over the stretching cylinders 1 and 2 and over the sizing cylinders R² and R⁴ where they take the glue they require in order to stick together and to get a supply of glue for being pasted upon the stamped box. Then the strip A, passes over the cylinder 3, and the strip B, under the cylinder 4, and the two come together upon cylinder 5, where they stick to each other. The sizing cylinders R² and R⁴ have a rotary movement given to them by the cog wheels $r$, $r'$, $r^3$, $r^4$, $r^5$, and by the chains $d$, and $e$, which receive their movement from the wheel $r$, which in turn receives motion itself from the gearing R', R Fig. 4, and from the shaft E. The movement of the cylinders R² and R⁴ is intermittent in consequence of the use of a clutch box which makes E, move only during the forward movement of the clutch which movement corresponds to the length of the strip necessary to feed forward at each movement to go around the box. This clutch will be described hereinafter.

In order to prevent too sudden movements and as a consequence thereof a too great unrolling of the paper from the cylinders R' and R³, I have placed two brakes F, which act by their own weight on the rolls of paper or cylinders. The two strips superimposed and pasted together at the cylinder 5, form when they come from that cylinder a composite strip A', which passes over the roller 6, and between two pressing cylinders G, $g$, moved intermittently by the cog wheels R, and R' controlled by the lever 7, Figs. 1, 4, and 9 which acts during a time varying according to the lengths of paper which is to be obtained. Lever 7, receives its movement from a rod 8, through the medium of a lever 9, Fig. 2, of a rod 10, and of a cam 11, which is fixed upon the shaft H, of the machine. The to and fro movement of the lever 7, works only in one direction upon the cylinders G and $g$, by reason of the use of the clutch box D, Figs. 9 and 10. The strip A', is drawn on at intervals and moved step by step; in the first movement, the strip A', advances enough to make it possible for the sliding carriage K, Figs. 2, 5, 7, 13, 14 and 15 to take hold of it and in the second movement the strip advances enough to go around the box without being the least bruised or receiving any backward straining movement from the cylinders G and $g$. The glue in excess upon the strip A', is partly left upon the felt over which it passes, which covers the cylinders and absorbs the glue. This felt may be easily replaced. The glue taken from the strip by the cylinder G, is caught by a scraping cup $i$, fixed to the bearer $j$. From the cylinders G and $g$, the strip A', passes over a stretched felt $h$. This felt is stretched between the bearers 12, and 13, Figs. 1, and 2. The strip before reaching the felt $h$ contacts with the movable felt $f$ which passes around the cylinder $g$ and at its other end about the roller $g^2$. I may also make the strip A, advance continuously and therefore the cylinders G and $g$, may have a continuous rotary motion.

The axle E, Figs. 1, 4, 9 and 10 is moved step by step and this movement through the gearing mentioned is transmitted to the cylinders. The step by step movement to the shaft is given from the rod 8 through the arm 7 which has at its lower end the clutch box $y$ loosely surrounding the shaft and containing rollers $y'$ which clutch with the inclined teeth $y''$ fixed on the shaft when the arm 7 is rocked in one direction but which merely rotate when the arm is rocked in the other direction so that the shaft will be turned only when the arm is rocked one way. Springs $y'$ push the rollers constantly toward the small ends of the pockets in the clutch. This clutch is of substantially ordinary form and requires no further description.

The boxes which must be shaped, are put by the hand in a vertical conduit or reservoir M, Figs. 5, 7 and 16, on a sliding carriage N. They fall by gravity one by one and they are shaped at the lower end of the conduit at the point $m$ as will be described and then they are moved forward and lodged on the chuck O in proportion to the reciprocations of the carriage N, at the rate of one for every revolution of the shaft H. The sliding carriage N, is worked by the cam $n$, affixed to the axle H, of the machine, Fig. 7. Tongs 20 and 22 (Figs. 16 and 19) are disposed upon the sliding carriage N. Tong 20 is provided with an appendix 21. These tongs have a semi-circular form. The capsule or box which drops at $m$, is kept back by the appendix 21 of the tong 20, which appendix obstructs the opening of $m$, when the tongs 20 and 22 are drawn back. The capsule being located in $m$, and the piston being removed, the sliding carriage N, moves toward the chuck. The tongs 20 and 22 advance in the direction of the capsule and the appendix 21, withdraws as it is solidly connected with tong 20. The capsule is then pressed by the tongs which give it a circular shape. The sliding carriage N, moves still farther forward with the capsule, and the latter maintained by the piston 23, is put upon the chuck O, which revolves in order to facilitate the chucking; at the moment the sliding carriage N, withdraws the tongs relax their hold and the appendix is again in its place for another operation. When the box or capsule is chucked the piston 23, presses on it until after the pasting of the strip A', and then the piston moves suddenly back to take its place again in $p'$. The piston revolves with the chuck O, for it is located at the extremity of a rod 24, which is provided with a groove, and is kept in part 26, by a pin. The piston is carried and moved by the tube $p$, to which motion is given by the rod 8.

The driving means for the various parts thus far described are as follows: The sliding carriage N, is put in motion by the cam $n$, and by the depending stud 27. The piston 23, in Fig. 7, is set in motion by the cam $r$, affixed upon H, which operates the stud 28, which gives its movement to the sliding carriage N', to which the rod 9, is fixed.

The tongs are put in working in the following way: Two columns $s$, Figs. 5, 7 and 16, fixed upon the table Q, maintain fixed and rigid the part $t$, which forms a cross bar for the same. A roller 29, is coupled to $t$, the rolling of which can be made more or less easy by the means of a thumb screw which presses it more or less against $t$. The axle of that roller being fixed the groove 30, Fig. 5, in the cylindrical part $p'$ of the carriage N, gives to said carriage N, a rotary reciprocatory motion when moved back and forth lengthwise by the cam $n$. As a consequence of the rotation of shell or plate $p'$, the parts 31 of N, which are provided with the eccentric grooves 32, Figs. 16, 19, and 20, revolve also. The laterally extending parts 31 as clearly indicated in Fig. 20, are arranged as extensions of the cylinder $p'$. The rollers 33, fixed to the parts 34, which slide in the parts 35, Figs. 5, 19, and 20, fixed on the carriage N, against rotary movement, engage the grooves 32. The rods 36, Figs. 5 and 20, are fixed perpendicularly to the part 34, and these rods slide in a rectangular opening made in 37, upon which is fixed the reservoir M. The tongs are fixed upon the rods 36. The plate 37, is kept in its place by the little columns or cross ties 38. The grooves 32, being eccentric as before stated, the rotation of $p'$ and of 31 causes the rollers 33, and also the slide 34 and posts 36, with the tongs to move away from or come nearer to the center of the opening $m$. It will be understood that the cup shaped blanks when fed into the hopper M, may not be perfectly circular, but when grasped by the tongs they are pressed into circular form and may thus be placed readily on the chuck. The carriage may have a face plate $37^x$ shown in Fig. 16, covering the front portion thereof and arranged in front of the tongs. This plate is omitted in Figs. 19 and 20. It has a central opening for the passage of the piston. This plate is also shown in Fig. 7.

The capsule being held solidly upon the chuck O, by the piston 23, as in Fig. 21, the pasting on of the strip can be done. For this effect the chuck $o$, is given a constant rotary motion which is caused by the axle H, through the medium of the cog wheels U and V and X Fig. 7.

Let us follow the strip A'; we have left it on the felt $h$. After having passed over the felt $h$, the strip A' passes over the directing roller 14, Fig. 2, and between the pressing roller 15, and the metallic table 18, which is independent of the carriage K. The strip A' is then drawn forward at intervals by the cylinders 39 and 40, Figs. 2, 13, 14 and 15. The roller 15, has for its object to prevent the paper going back when the carriage K, goes back so that its gripping members will take hold of the strip A', and also to constitute a brake when the paper is drawn by the cylinders 39 and 40 as the paper lifts it up and becomes stretched by so doing. The roller 15, is located at one of the extremities of a lever 16, of which the other extremity is depressed by a support 17, fixed to the carriage K, in order to allow the strip A', to pass. The strip A', being on the metallic table 18, and having just been cut by the scissors L, Figs. 13, 14 and 15, which are movable with the carriage K, is ready to be wound about the box on the chuck.

The feeding of the strip forward to be cut is done as follows: The upper roller 39, may move up and down and is free to move in the direction of the arrow, Fig. 13, in order to allow the carriage K, to go back without carrying A', along with it. The carriage K, retracts to afterward advance the necessary distance to feed the strip forward to be caught between the chuck O, and the cylinder 41, and at the end of said backward movement the upper roller 39 grips the strip between itself and the lower roller 40. When the strip has been gripped, the carriage K, advances the necessary distance so that the strip will be caught at its extremity between the chuck O, and the cylinder 41. In order that the cylinders 39 and 40 can carry forward the paper placed between them, which requires that they do not roll while the carriage is advancing, they are provided with teeth to be engaged by pawls 44, which allow the rollers to roll at the time K, is moving back to take hold of the strip A' to furnish the necessary length to be cut and pasted but on the contrary stroke the pawls hold the rolls against rotary movement when 39, is lowered and presses A', upon 40, to bring forward the strip. At this moment the cylinder 41, Figs. 2, 13, 15, and 7 is lifted up and presses the extremity of the strip upon the capsule held by the chuck O, and constitutes the pasting cylinder during the duration of the dressing of the capsule. The strip is now severed by the scissors L, to make the proper length; as soon as the pasting upon the capsule has begun, the corrugating must also commence. A circular brush 42, Figs. 2, 5, 18 and 21, on a vertical axle is constantly rotated. The brush is supported to swing to and from the chuck and when in working position it bears against the corner of the capsule, which forces the strip which is covered with glue to stick upon the bottom and which corrugates the bent over edge of the strip as shown at $x$, Fig. 22. In order to prevent the brush wearing or rubbing against the piston or against the tube $p$, of the piston 23, an opening has been made in the tube $p$, as shown at $p^2$, Fig. 21. In case a strip should not stick to the capsule and in order to prevent it from rolling around the pasting cylinder 41, the latter is connected with another small cylinder 42, by means of three silk threads 43, Figs. 13 and 15, which guide the strip, and direct it outside the machine.

The motion of the driving gear is as follows:—The reciprocating motion to the carriage K, is given by the groove 45, formed in the cam 46, and the roller 47, of the rod 48, Figs. 2, and 17, which slides between rollers 49 and 50; the face plate 51 loose on the axle 52, but connected with the face plate 53, which is fixed upon the axle 52, by a bolt riveted upon 51, which can slide in a groove made in 53, with the object of regulating the position of the carriage K. From face plate 53, the motion is given to the axle 52, the arm 55, the connecting rod 56 and finally to the lever 57, coupled at 58, and further to the toothed sector 59, engaging the rack 60, fixed under the carriage K. A spring $r$ draws the lever 57, backward. Rollers $k^2$, Fig. 14, guide the carriage in its motion.

The roller 39, is lifted in the following manner:—It is fixed upon support 62, pivoted at 63. Two arms, 64 provided with rollers are lifted by two movable rods 65, the extremity of which 65' rests on a point; 65 is lifted by two arms 66, on a shaft 67, which receives a rotary motion from the lever 68, which is also fixed upon it and the lever 68, is provided with a roller and receives its primary motion from cam 69, on the axle H. The springs 69', are arranged to keep 39, in contact with 40.

The pasting or pressure cylinder 41, is lifted as follows: It is mounted upon a support 70, Fig. 15, movable around the axle 71, Fig. 13. This support carries underneath two arms 72, upon which rod 73, provided with a roller lifted by the cam 74, acts in order to lift 70 and consequently 41. The support 70, falls down by its own weight at the moment the high part of the cam passes it.

The brush 42, is given a rotary movement and is brought in contact with the capsule as follows: A cam 75, upon H, displaces by an angular motion the arm 76, Figs. 2 and 18, provided with a roller. That arm 76, upon the axle 77, imparts to it a rotary motion as well as to the toothed sector 78, which works the pinion 79 mounted upon the axle 80, which turns and displaces the support 81, upon which the brush 42, is mounted. Now the continuous rotation of the brush is obtained by the toothed wheel 82, Fig. 5, upon the part X, of the chuck. This wheel 82, engages wheel 83, mounted upon 84, which imparts the motion to the beveled wheels 85 and 86, the beveled wheels 88 and 89, the axle 90, the wheels 91 and 92, the axle 93 and finally to the brush 42. 86 and 88 are loose on 87, which forms the prolongation of 80, in order to obtain the angular displacement of 81 and 90, mounted at 87, which changes can take place without preventing the rotation of the parts. A spring 80' dotted lines Fig. 18 presses continually the roller of the arm 76, against the cam 75, acting upon the axle of the former.

*Cutting mechanism.* — We have left the strip A' at the moment of its winding round the chucked capsule, by the rotary motion of the chuck O. The cutting of the strip A' now is done in the following manner: When the length of the strip necessary for the dressing of the capsule has passed the extremity 19, Fig. 13, of the independent table the scissors L, Figs. 13, 14 and 15 coupled to a support 94, fixed to the carriage K, cut the strip A', following it in its forward motion in order to make a perpendicular cut to the direction of the winding. Fig. 15$^a$ represents the slotted construction of the table 18 and the forked extremity 19, the parts of which extend along the sides of the rolls.

The scissors are worked as follows: A lever 95, Fig. 7, is worked at one of its extremities by a cam 96, and at the other extremity a spring 97, acts in the opposite direction to establish a constant contact between 95 and 96. This lever presses on an arm 98, which works the upper blades of the scissors (the lower blade is fixed) closing the same, to cut the strip A'.

*Ejecting device for the capsule.*—The strip A', being pasted and corrugated upon the capsule, the latter must be ejected and sent to the place where the upwardly projecting edge of the paper is to be turned in. To that effect, the chuck O, which is hollow inside contains a piston, Fig. 7, which is kept flush with the face of the chuck, while the strip is being pasted, by a spiral spring 100, which keeps it back. After the pasting has been performed the cam 101 acts upon a lever 102 which pushes the piston that ejects the capsule dropping the same in the conduit or chute passage 103. The piston does not revolve by reason of a groove $c^x$. It is provided with and by reason of the screw $c$, Fig. 7, which catches into it. In order to compel the capsule to fall upon its bottom, the flap 104 with a diameter equal to the interior diameter of the chuck and located in the same is pivoted at its lower end. At the moment that the piston presses upon the capsule a little plate spring 105 located behind the flaps makes it act upon the superior part of the capsule and by so doing forces the same to fall upon its bottom. The capsule consequently falls upon the chute 103. This chute pivoted to the chute 106, is lifted up or vibrated by the cam 107, Figs. 2 and 7, and by the guided rod, 108, in order to compel the capsule to slide along the chute. The capsule slides through the closed passage 109 which directs it to the socket 110, Figs. 3 and 6 in the revolving table. In order to prevent a momentary stopping of the machine or the accumulation of capsules in the passage 109, a flap 111 is provided at the lower discharge end of said passage as in Figs. 3 and 3$^a$. This flap is pivoted at 112, and has an arm 114 to which is connected a spring 113 to hold the flap normally up so that the capsule may slide over the flap into the socket 110. Each time the plunger 116 descends the arm 115 connected therewith operates the finger 114 with which it engages and the flap is turned down into the position shown in Fig. 3ª and if at this time the capsule for any reason has lodged at the lower end of the passage instead of being properly discharged it will now be discharged or deflected through the opening left by the lowering of the flap and will fall outside of the machine entirely and the only result will be that one of the sockets 110 will be left empty.

Referring to Fig. 7, it will be noticed that the capsule when formed stands with its bottom and top in vertical planes while its periphery is horizontal. In discharging it the upper edge is tilted outward so that the capsule in effect is given a quarter turn, its lower edge being the pivoted point. In order that the capsule may be thus discharged it is necessary to retard the advance of the carriage N so that the capsule in turning will not be interfered with in order that it may fall upon its bottom upon the discharge chute 103. It is thus necessary to reduce the speed of the axle H, as it would not be possible to stop it entirely as this would occasion a delay in the different operations. We must consequently pass from a normal speed to less speed and to obtain that result I employ a particular device by which the speed of the axle H, is reduced and also the speed of motion of all other parts of the machine which are dependent of that axle, at the moment of the dropping of the capsule. The driving power is furnished by the axle H″, Figs. 3 and 8. The wheel 117, is fixed on that axle. This wheel meshes with 117′ which is on axle H′. Upon this axle H′ the wheels 118, and 119, are fixed: 118 meshes into 121 and 119 into 120, Figs. 5 and 6, 120 and 121 are fixed on the axle H, to which we desire to furnish two different speeds. For that reason the motion is imparted either by 118—121 and then the speed is greater or by 119—120 and then the speed is reduced. The whole of 118—121 transmits the motion to H, giving it a high speed almost for an entire revolution except for the section 122, Fig. 31, which is not provided with teeth. It is at the moment that this portion comes around that 119—120 acts by the section 126—128, upon the wheel 120, engaging the section 127—131 on the wheel 119. Supposing that a box has just been ejected, then wheel 118, meshes with 121, the tooth 123 of the wheel 118, engages 121, by tooth 124; we will then have a maximum speed up to the point where the last tooth 125, of the wheel 121 escapes from the wheel 118, and at this moment, the axle H′ continuing to revolve tooth 127, of the wheel 119, catches into the tooth of the wheel 120, and the speed will be reduced and will remain the same till the last tooth 128, of the wheel 120, will be free from wheel 119. At the moment that the last tooth 128, quits the tooth 131 of 119, tooth 123, catches again into 124, in order to cause an increase of speed, but then there would be a wedging or jamming action between the teeth of wheels 120 and 118, if special means were not provided to prevent this. In order to prevent this I have taken away the intermediate tooth between 129 and 130 and have articulated tooth 129. It will thus be seen that at the moment 123, catches into 124, tooth 131, still presses upon 128, and this tooth 128, drives away the movable tooth 129, which has room for movement because of the omission of the intermediate tooth and the motion will be transmitted by 118—121. A spring 132, forces tooth 129, back to its normal position.

The mechanism for turning and pasting of the paper inside the capsule will now be described. The capsule having had the paper pasted on the outside as in Fig. 32 and projecting above the rim as in Fig. 22, passes down the channel or discharge chute 103 and having fallen into the guide opening 133, Fig. 3, of the plate 135 is ready to be deposited in one of the cups or sockets 110 of the revolving table. The piston 116 is now lowered and places the capsule at the bottom of the socket 110, upon piston 134, Fig. 3, which is lowered. This piston rises in order to receive the capsule and it is lowered at the same time as 116. As soon as this has happened the two face-plates or tables 135 and 136, are moved (there are just as many guide openings 133, drilled in plate 135, as there are sockets 110, in 136. The only object of the openings 133, is to guide the capsules by their conical shape to the sockets 110), and the face plate 136, is connected with 135 by small cross pieces e′ located between the openings and sockets. The progress of the plates is step by step and only one socket and guide opening for each revolution of the axle H′, by which a fresh capsule which falls into a socket has three capsules before it in the sockets in advance, and one which is being pressed at the moment the fresh capsule is pushed by piston 116. This last mentioned capsule has arrived under the pasting piston 137, which is made of rubber, and before the devices for the turning in of the paper which devices are fixed upon the plate 138. These devices comprise four sectors 139, Figs. 6, 8 and 23, which pass between the plates 135 and 136 as shown in Fig. 8, and which retract in order to let the pasting piston 137 fall. The turning in, is done as follows: The capsule being in position in the socket 110 and resting on the solid part of the frame 110ˣ which is shown in Fig. 8, and which constitutes the bottom of the sockets, the sectors 139, proceed to the center of the socket and consequently turn over the projecting edge of the paper horizontally. Then piston 137, comes down and the sectors then retract leaving the paper edge to be folded down inside the box by the piston 137. Piston 137 continues its course and being exactly of the same diameter as the inside of the capsule it turns down the edge of the strip completely and presses it into the inside of the same where it sticks. The paper being turned in, the piston 137 rises up again and in order to prevent the capsule following its upward movement or the paper to turn up again the sectors advance again near the piston not so as to touch it, but near enough to the edge of the capsule to keep it in the socket. As soon as the piston has come out the face plates 135 and 136 move one step in order to bring the next capsule to the piston. The solid portion 110˟ of the frame before mentioned as constituting the bottom of the socket 110 and consequently the rest for the capsule extends from the point where the opening is formed for the pistons 116, 134, Figs. 3 and 6, to the point where the opening is formed for the piston 177 hereinbefore described, thus furnishing a bearing surface over which the capsule is passed by the movement of the socket table or plate 136.

The driving power of the different parts just mentioned works as follows: The piston 137, receives its motion from a forked lever 140, Figs. 3, 6 and 8, upon an axle 141, which axle itself gets its motion from the lever 142, worked by the cam 143 on the axle H'. The inferior plate changes its position by means of the cam 144, on axle H'. That cam acts upon the lever 145, which is fixed to the pawl carrier 147, Fig. 8, and dotted lines, Fig. 6, and is constantly held back by the spring 146. The pawl carrier 147, is pivoted at 148 and has a pawl 149, which causes a rack wheel 150, fixed to the plate 136, movable around the axle 151, to advance the distance of one tooth for every revolution of H'. In order that the socket of the plate come each time directly below the piston 116 and the piston 137, which presses the paper down, a stop 152 has been established kept at the bottom of notches 153, made between the sockets. When the plate 135 turns, the stop 152 is lifted by the notches which are well rounded out and bell mouthed and when the next notch of said plate comes around the stop drops into it and holds the plate until the next action is to take place.

Figure 25:
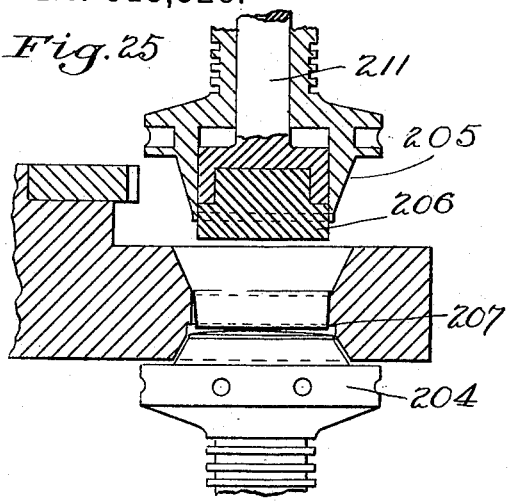
Figure 26:
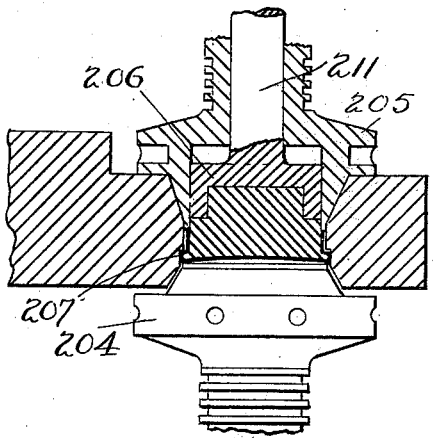
Figure 27:
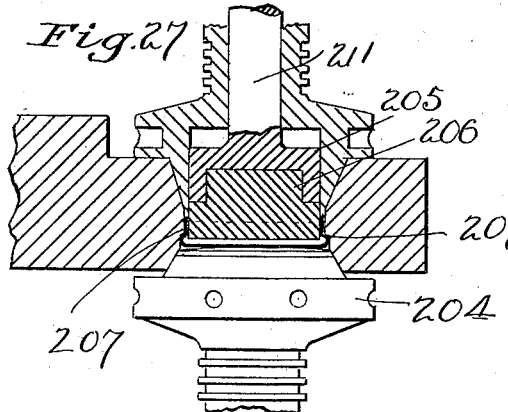
Figure 28:
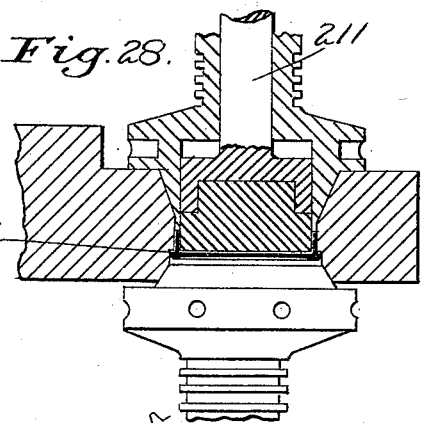

The pressing down piston 137 and sectors are worked as follows: The four sectors 139 are fixed to the parts 154, Figs. 8 and 23. These parts 154, are fixed to the racks 155, which slide in grooves which are made between two plates 156 and 157. These grooves extend through the plates to let the parts 154, pass, Fig. 8ᵃ. Four pinions 158 are fixed between the two plates 156 and 157, engaging the racks 155. These pinions engage a wheel 159 which turns freely in the superior plate 156. This wheel turns by the working of a standard 160 fixed to it and projecting up through a curved slot 161˟ in the upper plate Fig. 6; a lever 161 pushes the standard which oscillates the wheel 159, the racks and finally the sectors which are fixed to the latter. It is the cam 162, Fig. 8, which makes the lever 163, turn the axle 164, which is fixed to said lever. The axle by turning acts upon link 165, Fig. 6, which is on it, and finally upon 161. (The lever 163 is in a constant contact with the cam 162, by the means of the spring 176.) The piston 116 is continually pushed by a spring 166, Fig. 3, located in a tube. This piston is lifted, to let the capsules fall in the sockets; by means of the lever 167, Figs. 3, 6 and 8 fixed upon the hollow sleeve 168, which has another arm or lever 169 which is worked by the cam 170 on shaft H', Figs. 3 and 8. The lower piston 134 is constantly held down by the spring 171 and it comes up to follow the capsule, aided by the lever 172, upon the axle 173 which passes through the interior of 168 and is independent of it. The lever 174 which is worked by the cam 175 is fixed on 173. The capsule having the paper pasted and turned down in its inside, the plate 136, continues to turn around at a rate of one socket for each revolution of the axle H. When each socket comes below a piston 177, Fig. 3, the capsule it contains is ejected by the same and placed in an opening or socket of the plate 183, which carries it to the pressing machine. Fig. 25, shows the position of the capsule as the piston 177, leaves it. The piston 177, is worked by a lever 178, coupled to the support 180 at 180˟, Figs. 3, 6 and 30. This lever is operated or swung up and down on its pivot through the reciprocation of the upper cross head 181 of the pressing mechanism hereinafter described to which the lever is connected by the post 182 pivoted to the lever at 179. The capsule after being placed in the socket of the plate is then carried to the press, the pressing operation taking place in the plate 183, when the socket has reached the position shown on the left of Fig. 3.

In order to carry the capsule to the pressing machine the plate 183, is given a rotary motion imparted to it by the axle 184, which axle is worked by the gearing 185, between the plate or table 183 and plate 135 as in Figs. 36 and 29; but as there is always some play between the teeth of a cog wheel every socket of the plate 183 would not be placed directly opposite the pressing members. To remedy this the motion is given also by a friction clutch combined with a safety bolt. The cone 186, loose on 184, is put in motion by gear wheels 188, 189, 190, 191, 192, 193 and 194 and finally by shaft H''. The cone 186 is in contact with 187, fixed on 184 and when the motion of the plate 183 is steady the cone 186 turns upon the cone 187, without carrying the axle 184 forward; but if there is any tendency of lost motion arising between the toothed edges of the plates 183 and 135 at 185 the friction clutch will advance the shaft 184 to take up the slack. The bolting of the plate happens as follows: Between each of the sockets of the plate 183 a notch 196, Figs. 6, 29 and 30, has been made with rounded sides so as to facilitate the entrance of the bolt 195. This bolt is bent over to project into the notches of the plate as in Fig. 30, and made the stop. This bolt is guided by a support 197 fixed to one of the beams 198 of the framing of the machine and is worked by a spring 199, which gives it a back motion fixed to the lever 200 and coupled at 201. This lever 200 is fixed to the rod 202, which is fixed itself to the bolt. In order that the bolt 195 may be withdrawn to let the plate revolve, a cam 203, on the axle H' presses upon the lever 200, and makes the bolt come out of the notch 196.

*Pressing of the capsule in order to obtain a rim.*—The capsule being located in the plate 183, the piston 204, Figs. 3, 25, 26, 27, and 28 rises and locates itself in the lower conical part of the opening in the plate or table 183, leaving a certain play; at that moment the piston has no other use than to support the bottom of the capsule as in Fig. 25; then the piston 205 and the rubber 206, come down. This piston enters closely the upper conical part of the opening in plate 183, and as this piston has at its extremity a cylindrical piece of rubber said rubber will completely fill the interior part of the capsule and will compel the same to assume the form of the opening as in Fig. 26, in which opening is formed a rim or overhanging edge. At this period of the operation we have only a rough rim; then the rubber alone comes back a little, as in Fig. 27, and the piston 204, blocks up entirely the lower cone which causes the bottom of the capsule to rise and assume the shape of the rim or edge 207 in the opening, for the rubber, now, presses only upon the bottom of the capsule without pressing on the rim. After this the pressing is accomplished and the two pistons retire to let the plate 183 revolve.

The different motions are as follows: The piston 204 is screwed in a sliding piece or cross head 208, Figs. 3 and 30 in order to regulate it and to make good the wear. The piece or cross head 208, slides within the beams 198 of the frame and is worked by the cam 209, upon shaft H', which acts upon the roller 210. The piston 205 is also screwed in a sliding cross head 181. The piston is hollow and there is a rod 211, to which the rubber 206 is fixed. The rod 211 can slide in the interior of the piston and is secured to an arm 212 and it is also possible to regulate the pressure of the rubber by the means of the screw nut 213, which presses the spring 214 against the rod 211. The screw nut 213 and the spring 214 are supported against the cap of the frame. The arm 212 is moved by the rod 216 and the cam 217. Spring washers 218, Figs. 3 and 30, are interposed between the upper head 181 and a shoulder on the rod 216 to provide a cushion here.

The sliding cross head, 181, is lowered as follows: It is connected with the lower cross head 219, by two rods 220 and it is the lower cross head 219 which is lowered by the cam 221; two strong spiral springs 220<sup>×</sup> on the rods 220 keep the cross heads 181 and 208 pressed apart so that their respective rollers will be kept in contact with the cams 221 and 209. These springs serve also to move the cross heads apart so that the pistons 204 and 205 will separate from each other and will assume normal positions. In order to prevent the plate 183 being lifted up by the last pressing action of the piston 204, two stops 223 have been placed at a slight distance from said plate and adapted to be regulated at pleasure, as they are carried by screws working in the supports 224, fixed upon the bearers 198.

It will be understood that the movements of the cross heads 181 and 208 operate the pistons 205 and 204 toward and from each other, while the supplemental piston 206 on the rod 211 has movement with and independent of the piston 205 in which it is carried, and the several cams are so formed as to give the movements of the several pistons as shown in Figs. 25, 26, 27 and 28. The final ejection of the capsule takes place when each opening of the plate 183 passes under the piston 225, Figs. 6, and 6ª. This piston is formed of a tube 225, Fig. 6ª, which slides in a support 226, fixed to the support of the vertical axle 184 of the plate 183. The piston is bell mouthed at the extremity which acts upon the capsule to eject it, in order to press only upon the walls and not upon the bottom of the box. It is operated by the rod 228, coupled on the bottom 229, which rod is operated by the arm 230 fixed to 178. The ejected capsules fall in a passage 231.

I may use a modified arrangement in place of the felt *f*, which becomes impregnated with glue and must of course be replaced. This consists of a flat rubber strap 232, Fig. 11, which is operated by the rotary motion of the roller *g*, previously described. This strap passes over a second roller $g^2$ which turns in consequence of the rolling around it of the strap. The glue left by the strip A', upon 232 is taken away by the brush 233 which turns in a vessel full of water. The glue is taken away from the brush by a small scraper 235. This brush is operated by the axle H'', through the wheel 236, of the chain 237, and of the wheel 238 on the axle 239 of the brush 233. Another brush 240 which works upon the greater part of the length of the strap 232 dries the same by friction and by said brush moving in the opposite direction to the strap 232. The brush 240 is carried by the two cylinders 241 and 242. The cylinder 241 is operated by the axle 239, through the wheel 243 on the same and the chain 244 and by the wheel 245 on the axle 246 of the cylinder 241.

I claim—

1. In a box machine, a revolving chuck, a feed carriage for feeding the cup shaped blanks thereto and for holding the same thereon and having forming mechanism for the blanks means for operating said feeder and feeding mechanism for forcing the dressing strip to the chuck and the presser for clamping the end of the strip to the blank on the chuck whereby said strip will be wound on the blank, substantially as described.

2. In a box machine, a revolving chuck a feeding device for the cup shaped blanks, means for operating said feeding device, a reciprocating feed carriage for the dressing strip, the presser for clamping the end of the strip, to the blank on the chuck and the cutting device carried by the strip feed carriage, substantially as described.

3. In a box machine a revolving chuck to receive the cup shaped blank, a reciprocating carriage for feeding the blanks to the chuck, a piston carried by the same and having independent reciprocating movement in said carriage, the swiveled head on said piston to hold the blank on the chuck while the latter revolves, the means for feeding the dressing strip to the chuck the clamping device for holding the strip thereto as the chuck revolves and the operating mechanism for the parts, substantially as described.

4. In combination, the revolving chuck, the reciprocating feed carriage for the cup shaped blanks, the independently reciprocating piston on the carriage for pressing the blank on the chuck, the shaping tongs arranged on the carriage at the front of the piston, means for advancing and retracting said tongs as the carriage reciprocates the means for feeding the dressing strip and operating means for the chuck, the carriage and piston, substantially as described.

5. In combination, the chuck with means for rotating the same, the means for feeding the dressing strip to the chuck, the reciprocating feed carriage for the cup shaped blanks, the shaping tongs on said carriage, the movable slides 34, on the carriage to which said tongs are secured, the rotary reciprocating plate 31, having cam grooves 32, for operating said slides, and the rotary reciprocating part $p'$ connected with the plate 31, said part $p'$ having a groove 30, the stationary standard having a roller engaging the said groove, means for reciprocating the carriage whereby the part $p'$ and plate 31, will be oscillated and the means for feeding the strips to the chuck, substantially as described.

6. In combination, the chuck the means for revolving the same, the reciprocating carriage for feeding the body blanks to the chuck, the hopper carried on the same, the reciprocating piston in the carriage, the means for operating the same, the tongs at the front of the piston arranged to move on the carriage toward and from each other, the oscillating plate on the carriage for moving the tongs, the stationary bearing on the frame for engaging the oscillating portion to operate the same as the carriage reciprocates and the means for feeding the dressing strip to the chuck, substantially as described.

7. In combination, the revolving chuck with operating means therefor, the means for feeding the cup shaped body blanks to the chuck, the means for feeding the dressing strip to the chuck, the clamp for pressing said strip to the chucked blank, the plunger or piston, in the chuck and the pivoted flap in the chuck, substantially as described.

8. In combination, the revolving chuck with operating means therefor, the feed carriage for the body blanks operating in line with the axis of the chuck and carrying a reciprocating piston also operating in line with the chuck and the reciprocating feed carriage for the paper dressing strip operating at right angles to the axis of the chuck, substantially as described.

9. In combination, the revolving chuck with operating means therefor the feeding carriage for the body blank, the feeding mechanism for the paper dressing strip, and the brush carried on a movable support and arranged to act on the edge of the blank on the chuck, substantially as described.

10. In combination, the revolving chuck, with operating means therefor, the means for gluing the paper strip, the means for directing said strip the feeding mechanism and the means for removing the surplus glue consisting of the flexible band over which the strip passes, substantially as described.

11. In combination, the revolving chuck, the means for revolving the same, the feeding mechanism for the paper strip, the means for applying glue to said strip, and the means for removing the surplus glue therefrom comprising a flexible band over which the strip is passed, the brush for removing the glue from said band and the means for operating the brush and band, substantially as described.

12. In combination, the revolving chuck with operating means therefor, the reciprocating feed carriage for the paper dressing strip, the gripping rollers with means for preventing rotary movement in one direction, one of said rollers being movable toward and from the other, the means for operating the said roller and the shears on the carriage adjacent to the feed rollers and means for operating the said shears, substantially as described.

13. In combination, the revolving chuck, the reciprocating feed carriage, the gripping and cutting devices thereon for the dressing strip, the clamp roller for clamping the strip to the revolving chuck, the threads 43, and the carrying means therefor consisting of the said clamping roller and the roller 42, substantially as described.

14. In combination, the revolving chuck, the reciprocating carrier for feeding the body blanks thereto, the reciprocating carrier for feeding the dressing strip to the said chuck, the means for discharging the box from the chuck and the speed changing driving mechanism comprising the mutilated gears 119, 121 adapted to mesh with each other and the mutilated gears 118, 120 carried by the shafts of the gears 119 and 121 respectively, said gears 118 and 120 being arranged to engage each other when the gears 119 and 121 are out of mesh, the said gear 119 having its toothed segment mutilated and the movable tooth 129, substantially as described.

15. In combination, the revolving chuck, the means for feeding the body blank thereto, the means for feeding the dressing strip, the presser means for clamping the strip to the chucked body blank, the means for discharging the box from the chuck, the chute leading from the chuck the rotary table having step by step movement and provided with sockets arranged to move under the end of the chute, the piston mechanism for seating the box in the sockets of the table, the reciprocating sectors arranged at another station of the table for forcing over the upper edge of the strip, and the plunger for forcing the edge of the strip down into the box, substantially as described.

16. In combination, the revolving chuck, the means for applying the body blank and the paper strip thereto, the means for ejecting the boxes from the chuck the chute for conveying the partially formed box from the chuck, said chute being movable and the means for vibrating the same, substantially as described.

17. In combination, the chuck with means for rotating the same, the means for feeding the body blank and the paper dressing strip thereto, the revolving table having sockets to receive the partially completed box, the piston mechanism for seating the box in said sockets, the feed chute between the chuck and the said revolving socket table having a movable discharge end and the arm connected therewith and arranged to be operated by the piston mechanism, substantially as described.

18. In combination, the chuck, the body blank and strip feeding mechanism, the revolving table having sockets for the partially formed boxes, the chute between the chuck and the said table, the reciprocating sectors arranged to move back and forth over the sockets while said sockets are stationary beneath the sectors, the means for supporting the sectors and the vertically movable piston for forcing the edge of the strip down into the box, substantially as described.

19. In a box machine, the socket table or plate with means for moving the same step by step, the reciprocating sectors with means for supporting them over the path of the sockets, the means for reciprocating the sectors and the vertically movable piston with operating means therefor substantially as described.

20. In a box machine, the socket table or plate with means for moving the same step by step, the reciprocating sectors with operating means therefor, the racks carrying said sectors and extending radially therefrom the pinions engaging the said racks, the gear wheel for operating the pinions, the means for oscillating the gear wheel and the vertically reciprocating piston arranged over the path of the sockets, substantially as described.

21. In combination, the revolving chuck with means for operating the same, the feeding mechanism for the body blank and dressing strip, the rotary socketed table 136, with operating means therefor, the chute between said table and chuck, the reciprocating sectors and vertically movable piston adjacent to the table for bending the edge of the strip down within the box, the rotary socketed table 183, arranged in a plane below the table 136, the piston for transferring the box from table 136 to table 183 and presser mechanism operating in connection with the table 183, substantially as described.

22. In combination, in a paper box machine, the socketed table 136, with means for partially forming the box, the table 183 movable in a plane below the table 136 and having sockets to align with those of the said table 136, the transferring device for moving the box from one table to the other, the pressing mechanism operating in connection with the table 183, the gear connection between the tables and the friction clutch for driving the table 183, independently of said gear connection, substantially as described.

23. In a paper box machine the combination of the table 183 having a socket with an overhanging stationary shoulder 207 midway of said socket and the upper and lower pistons operating in connection therewith, substantially as described.

24. In combination, the table 183 having a socket with an overhanging shoulder 207, and an upper and lower conical opening, the means for feeding the boxes into said socket, the means for rotating the table and the means for pressing the box therein consisting of the upper and lower conical pistons, substantially as described.

25. In combination, in a paper box machine, the table 183, having a socket with an overhanging shoulder, the lower piston 204 adapted to the lower part of said socket and the upper piston having a rubber head adapted to spread laterally below said shoulder and within the box, substantially as described.

26. In combination, in a paper box machine, the table having a socket with an overhanging shoulder, the upper and lower pistons and the means for operating the same to cause both pistons to advance into the socket for the first pressure the said upper piston having a rubber head whereby the box edge is spread laterally under the shoulder and then to retract the upper plunger and advance the lower, substantially as described.

27. In combination, in a paper box machine, the table having the socket, with the overhanging shoulder the upper piston 205, with means for operating the same to and from the upper opening of the socket, the piston 206, projecting from the piston 205, and having its stem passing through the same, the means for operating the piston 206 independently and the lower piston 204 with means for operating the same.

28. In combination, the table 183 having the socket, with the overhanging shoulder the upper and lower pistons operating therein, the cross heads 181 and 208 sliding in ways of the frame and carrying the said pistons the cam shaft below the cross head 208, the cam thereon for raising the said cross head, the lower cross head 219 moving in the frame and connected to the upper cross head by the rods 220 and the springs for applying a tension to the cross heads, substantially as described.

29. In combination, the table 183, having the socket, with the overhanging shoulder the upper and lower pistons, the cross heads carrying the same, the supplemental piston 206 having a stem 211, passing through the piston 205 the arm 212 connected to the said stem, the rod 216 guided in the frame and extending downwardly, the cam shaft having a cam to operate the said rod and the cams for operating the piston cross heads, substantially as described.

30. In combination, the table 183 having the socket, with the overhanging shoulder the pressing pistons 204 and 206, with means for operating the same, the means for rotating the table, and the discharge piston with operating means therefor, said piston being flanged and adapted to bear only on the rim of the box, substantially as described.

In witness whereof I have hereunto set my hand in presence of two witnesses.

GABRIEL PATUREAU.

Witnesses:
E. RANOPH, Jr.,
J. H. GENOUFF.